US012692939B2

(12) United States Patent
Desjardins et al.

(10) Patent No.: US 12,692,939 B2
(45) Date of Patent: Jul. 28, 2026

(54) DOUBLE SEAL ELEMENT SEAL ASSEMBLY FOR AIRCRAFT SYSTEM

(71) Applicant: Pratt & Whitney Canada Corp., Longueuil (CA)

(72) Inventors: Michel Desjardins, Saint-Hubert (CA); Stephane Prunera Usach, Longueuil (CA); Guillaume Landry-Drolet, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 133 days.

(21) Appl. No.: 18/381,936

(22) Filed: Oct. 19, 2023

(65) Prior Publication Data

US 2025/0129750 A1 Apr. 24, 2025

(51) Int. Cl.
| | |
|---|---|
| *F16J 15/00* | (2006.01) |
| *B64C 27/12* | (2006.01) |
| *F01D 11/00* | (2006.01) |
| *F02C 7/28* | (2006.01) |
| *F02C 7/36* | (2006.01) |

(52) U.S. Cl.
CPC ............. *F16J 15/002* (2013.01); *B64C 27/12* (2013.01); *F01D 11/003* (2013.01); *F02C 7/28* (2013.01); *F02C 7/36* (2013.01); *F05D 2220/323* (2013.01); *F05D 2240/55* (2013.01)

(58) Field of Classification Search
CPC ....... F16J 15/002; F01D 11/00; F01D 11/001; F01D 11/003; F01D 25/18; F01D 25/183; F05D 2240/55; F05D 2220/323; F02C 7/28; F02C 7/36; B64D 35/00
See application file for complete search history.

(56) References Cited

U.S. PATENT DOCUMENTS

| | | | |
|---|---|---|---|
| 3,608,910 | A | 9/1971 | Tyler |
| 4,076,260 | A | 2/1978 | Legoy |

(Continued)

FOREIGN PATENT DOCUMENTS

| | | | |
|---|---|---|---|
| DE | 102018105088 | B4 | 2/2022 |
| EP | 0698185 | B1 | 10/1997 |

(Continued)

OTHER PUBLICATIONS

Partial EP search report for EP24207793.1 dated Mar. 20, 2025.

(Continued)

*Primary Examiner* — Elton K Wong
(74) *Attorney, Agent, or Firm* — Getz Balich LLC

(57) ABSTRACT

A system is provided for an aircraft. This aircraft system includes a power transmission, a clutch system, a stationary structure, a first seal element and a second seal element. The power transmission includes a first rotating structure that is rotatable about an axis. The clutch system includes a second rotating structure that is rotatable about the axis. The second rotating structure is coupled to and rotatable with the first rotating structure. The stationary structure circumscribes the first rotating structure. The first seal element is fixed to the stationary structure and sealingly engages the first rotating structure. The second seal element is fixed to the stationary structure and sealingly engages the first rotating structure. The second seal element is axially adjacent the first seal element.

17 Claims, 10 Drawing Sheets

(56)                     References Cited

U.S. PATENT DOCUMENTS

| | | | |
|---|---|---|---|
| 4,493,623 A | 1/1985 | Nelson | |
| 4,829,850 A | 5/1989 | Soloy | |
| 5,009,435 A * | 4/1991 | Villanyi | F16J 15/3232 |
| | | | 277/552 |
| 5,192,084 A * | 3/1993 | Norbury | F16J 15/3288 |
| | | | 277/355 |
| 8,313,281 B2 | 11/2012 | Rickert | |
| 9,708,074 B2 | 7/2017 | Jaenker | |
| 9,964,184 B2 | 5/2018 | Modrzejewski | |
| 10,557,359 B2 | 2/2020 | Amador | |
| 10,946,954 B2 | 3/2021 | Ehinger | |
| 11,054,033 B2 | 7/2021 | Vincent | |
| 11,313,455 B2 | 4/2022 | Mueller | |
| 2013/0277918 A1 * | 10/2013 | Fitzgerald | F01D 11/00 |
| | | | 277/355 |
| 2016/0146348 A1 | 5/2016 | Van Opstal | |
| 2017/0051834 A1 * | 2/2017 | Webster | F01D 11/02 |
| 2018/0119557 A1 * | 5/2018 | Amador | F04D 29/321 |
| 2019/0368393 A1 * | 12/2019 | Edwards | F02C 7/36 |
| 2020/0191276 A1 | 6/2020 | Kopp | |
| 2020/0284201 A1 * | 9/2020 | Gebhard | F02C 3/10 |
| 2023/0062203 A1 | 3/2023 | Wüstenberg | |

FOREIGN PATENT DOCUMENTS

| | | | |
|---|---|---|---|
| GB | 2140102 A | 11/1984 | |
| JP | 2016176536 A | 10/2016 | |

OTHER PUBLICATIONS

Rotorcraft Manufacturer's Data, Eagle Copters Ltd., Jan. 5, 2015, https://www.eaglecopters.com/wp-content/uploads/2022/11/56.-MD-E407-789-1-Rev-1.pdf.

* cited by examiner

DOUBLE SEAL ELEMENT SEAL ASSEMBLY FOR AIRCRAFT SYSTEM

TECHNICAL FIELD

This disclosure relates generally to an aircraft and, more particularly, to a seal assembly for the aircraft.

BACKGROUND INFORMATION

Various assemblies and methods are known in the art for sealing volumes within an aircraft system. While these known sealing assemblies and methods have various benefits, there is still room in the art for improvement.

SUMMARY

According to an aspect of the present disclosure, a system is provided for an aircraft. This aircraft system includes a first rotating structure, a second rotating structure, a stationary structure, a first seal element and a second seal element. The first rotating structure is rotatable about an axis. The second rotating structure is rotatable about the axis. The second rotating structure projects into a bore of the first rotating structure and is secured to the first rotating structure at an interface between the first rotating structure and the second rotating structure. The stationary structure axially overlaps the interface between the first rotating structure and the second rotating structure. The first seal element is fixed to the stationary structure and sealingly engages the first rotating structure. The first seal element is axially aligned with the interface between the first rotating structure and the second rotating structure. The second seal element is fixed to the stationary structure and sealingly engages the first rotating structure. The second seal element is axially next to the first seal element.

According to another aspect of the present disclosure, another system is provided for an aircraft. This aircraft system includes a first rotating structure, a second rotating structure, a stationary structure, a first seal element, a second seal element and a container. The first rotating structure is rotatable about an axis. The second rotating structure is rotatable about the axis. The second rotating structure is secured to the first rotating structure. The stationary structure axially overlaps the first rotating structure and the second rotating structure. The first seal element is fixed to the stationary structure and sealingly engages the first rotating structure. The second seal element is fixed to the stationary structure and sealingly engages the first rotating structure. The second seal element is axially next to the first seal element. A cavity is formed by and extends axially between the first seal element and the second seal element. The cavity is formed by and is radially adjacent the first rotating structure. The stationary structure includes a drain passage fluidly coupled to the cavity. The container is configured to collect fluid drained from the cavity through the drain passage.

According to another aspect of the present disclosure, another system is provided for an aircraft. This aircraft system includes a power transmission, a clutch system, a stationary structure, a first seal element and a second seal element. The power transmission includes a first rotating structure that is rotatable about an axis. The clutch system includes a second rotating structure that is rotatable about the axis. The second rotating structure is coupled to and rotatable with the first rotating structure. The stationary structure circumscribes the first rotating structure. The first seal element is fixed to the stationary structure and sealingly engages the first rotating structure. The second seal element is fixed to the stationary structure and sealingly engages the first rotating structure. The second seal element is axially adjacent the first seal element.

According to still another aspect of the present disclosure, a method is provided for an aircraft system. During this method, a first rotating structure is rotated. A first volume is fluidly separated from an inter-seal cavity using a first seal element. The first seal element sealingly engages the first rotating structure. A second volume is fluidly separated from the inter-seal cavity using a second seal element. The second seal element is axially next to the first seal element and sealingly engages the first rotating structure. The inter-seal cavity is pressurized to a fluid pressure that is higher than a fluid pressure in the first volume and a fluid pressure in the second volume.

The second rotating structure may project into a bore of the first rotating structure and may be secured to the first rotating structure at an interface between the first rotating structure and the second rotating structure. The stationary structure may axially overlap the interface between the first rotating structure and the second rotating structure.

The first seal element may be axially aligned with the interface between the first rotating structure and the second rotating structure.

The second seal element may be axially aligned with the interface between the first rotating structure and the second rotating structure.

The first seal element and the second seal element may each sealingly engage a common surface of the first rotating structure.

At least one of the first seal element or the second seal element may be axially aligned with a connection between the first rotating structure and a second rotating structure.

At least one of the first seal element or the second seal element may be axially aligned with a coupling between the first rotating structure and the second rotating structure.

The second seal element may be axially aligned with the interface between the first rotating structure and the second rotating structure.

A cavity may be formed by and extend axially between the first seal element and the second seal element. The cavity may be formed by and may be radially adjacent the first rotating structure.

The stationary structure may include a drain passage fluidly coupled to the cavity.

The system may also include a container configured to collect fluid drained from the cavity through the drain passage.

The first seal element may be axially between and may fluidly separate the cavity and a first volume. The second seal element may be axially between and may fluidly separate the cavity and a second volume. The second volume may be fluidly discrete from the first volume.

The system may be configured such that a fluid pressure in the cavity is less than a fluid pressure in the first volume and a fluid pressure in the second volume.

The system may be configured such that a fluid pressure in the cavity is greater than a fluid pressure in the first volume and a fluid pressure in the second volume.

The system may also include a first lubrication system and a second lubrication system. The first lubrication system may service one or more components within the first volume. The second lubrication system may service one or more components within the second volume.

The stationary structure may circumscribe the interface between the first rotating structure and the second rotating structure. The first seal element and the second seal element may each circumscribe the first rotating structure.

The first seal element may radially engage the first rotating structure. In addition or alternatively, the second seal element may radially engage the first rotating structure.

The first rotating structure may include a seal land surface. The first seal element and the second seal element may each contact the seal land surface.

The first rotating structure may include a first seal land surface and a second seal land surface. The first seal element may sealingly engage the first seal land surface. The second seal element may sealingly engage the second seal land surface.

The first seal element may be configured as or otherwise include a first lip seal. In addition or alternatively, the second seal element may be configured as or otherwise include a second lip seal.

The first seal element may be configured as or otherwise include a first polymeric material. In addition or alternatively, the second seal element may be configured as or otherwise include a second polymeric material.

The first seal element may be configured as or otherwise include a first carbon face seal. In addition or alternatively, the second seal element may be configured as or otherwise include a second carbon face seal.

The system may also include a seal carrier removably mounted to the stationary structure. The first seal element and the second seal element may each be attached to the seal carrier.

The first seal element and the second seal element may each be attached directly to the stationary structure.

The system may also include a bearing rotatably mounting the first rotating structure to the stationary structure. The bearing may be axially next to the second seal element.

The system may also include an aircraft powertrain including a powerplant, a power transmission, a clutch system and a bladed rotor. The power transmission may operatively couple the powerplant to the clutch system. The clutch system may operatively couple the power transmission to the bladed rotor. The powerplant may be configured to drive rotation of the bladed rotor through the power transmission and the clutch system when the clutch system is engaged. The power transmission may include the first rotating structure. The clutch system may include the second rotating structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
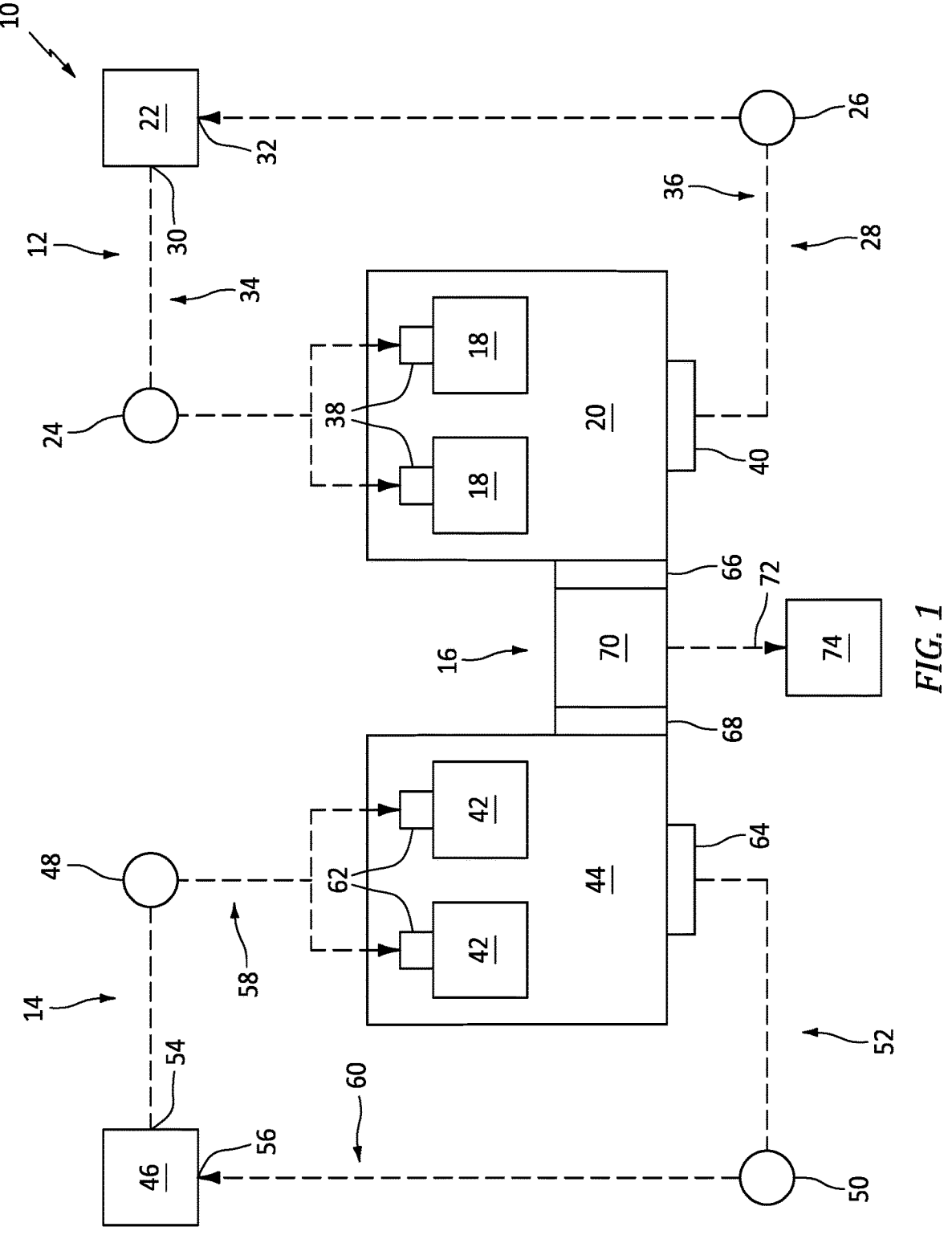
FIG. 1 is a schematic illustration of an aircraft system.

FIG. 1 schematically illustrates a system 10 for an aircraft. The aircraft may be an airplane, a rotorcraft (e.g., a helicopter), a drone (e.g., an unmanned aerial vehicle (UAV)) or any other manned or unmanned aerial vehicle or system. The aircraft system 10 includes a first lubrication system 12, a second lubrication system 14 and a seal assembly 16.

The first lubrication system 12 is configured to service (e.g., lubricate, cool, etc.) one or more first components 18. Examples of these first components 18 include, but are not limited to, bearings, meshing gears, dampers, and the like. One or more of these first components 18 are arranged within, or otherwise in fluidly coupled to, a first volume 20 within the aircraft system 10. This first volume 20 may be a cavity, a passage or a network of fluidly coupled cavities and/or passages.

The first lubrication system 12 is fluidly coupled to and configured to deliver first lubricant to the first components 18. The first lubrication system 12 of FIG. 1, for example, includes a first lubricant reservoir 22, a first source pump 24, a first return pump 26 and a first lubricant circuit 28. This first lubrication system 12, of course, may also include various other fluid system components, which are not shown in FIG. 1 for clarity of illustration. Examples of these other fluid system components include, but are not limited to, one or more filters, one or more sensors, one or more additional pumps, one or more valves, one or more heat exchangers, and the like.

The first lubricant reservoir 22 is configured to store a quantity of the first lubricant before, during and/or after aircraft system operation. The first lubricant reservoir 22, for example, may be configured as or otherwise include a tank, a cylinder, a pressure vessel, a bladder or any other type of lubricant storage container. The first lubricant reservoir 22 includes an outlet 30 from an internal cavity within the first lubricant reservoir 22 and an inlet 32 into the internal cavity within the first lubricant reservoir 22.

The first lubricant circuit 28 may include one or more sub-circuits, which sub-circuits of FIG. 1 include a first source circuit 34 and a first return circuit 36. The first source circuit 34 fluidly couples and extends longitudinally between the first lubricant reservoir outlet 30 and one or more first lubricant feeds 38; e.g., outlets, nozzles, jets, etc. These first lubricant feeds 38 are configured to inject, spray and/or otherwise deliver the first lubricant to one or more or all of the first components 18; e.g., into the first volume 20 onto/towards the first components 18. The first source pump 24 is fluidly coupled inline with the first source circuit 34 between the first lubricant reservoir 22 and the first lubricant feeds 38. The first source pump 24 may thereby direct (e.g., pump) the first lubricant through the first source circuit 34 from the first lubricant reservoir 22 to the first lubricant feeds 38 for lubricating, cooling and/or otherwise servicing the first components 18 within and/or otherwise fluidly coupled with the first volume 20.

The first return circuit 36 fluidly couples and extends longitudinally between at least one first lubricant collection device 40 (e.g., a sump, a gutter, a drain, etc.) for the first volume 20 and the first lubricant reservoir inlet 32. The first return pump 26 is fluidly coupled inline with the first return circuit 36 between the first lubricant collection device 40 and the first lubricant reservoir 22. The first return pump 26 may thereby direct (e.g., pump) the first lubricant through the first return circuit 36 from the first lubricant collection device 40 to the first lubricant reservoir 22.

The second lubrication system 14 is configured to service (e.g., lubricate, cool, etc.) one or more second components 42. Examples of these second components 42 include, but are not limited to, bearings, meshing gears, dampers, and the like. One or more of these second components 42 are arranged within, or otherwise in fluidly coupled to, a second volume 44 within the aircraft system 10. This second volume 44 may be a cavity, a passage or a network of fluidly coupled cavities and/or passages. The second volume 44 of FIG. 1 is fluidly discrete (e.g., fluidly separate, fluidly decoupled, etc.) from the first volume 20. Moreover, the second lubrication system 14 is configured fluidly independent of the first lubrication system 12. The first lubrication system 12, for example, does not provide lubricant to nor receive lubricant from the second lubrication system 14. Similarly, the second lubrication system 14 does not provide lubricant to nor receive lubricant from the first lubrication system 12. Each of the lubrication systems 12, 14 may thereby circulate is own discrete lubricant, where the lubricants circulated within the lubrication systems 12 and 14 may be a common type of lubricant or different types of lubricant.

The second lubrication system 14 is fluidly coupled to and configured to deliver second lubricant to the second components 42. The second lubrication system 14 of FIG. 1, for example, includes a second lubricant reservoir 46, a second source pump 48, a second return pump 50 and a second lubricant circuit 52. This second lubrication system 14, of course, may also include various other fluid system components, which are not shown in FIG. 1 for clarity of illustration. Examples of these other fluid system components include, but are not limited to, one or more filters, one or more sensors, one or more additional pumps, one or more valves, one or more heat exchangers, and the like.

The second lubricant reservoir 46 is configured to store a quantity of the second lubricant before, during and/or after aircraft system operation. The second lubricant reservoir 46, for example, may be configured as or otherwise include a tank, a cylinder, a pressure vessel, a bladder or any other type of lubricant storage container. The second lubricant reservoir 46 includes an outlet 54 from an internal cavity within the second lubricant reservoir 46 and an inlet 56 into the internal cavity within the second lubricant reservoir 46.

The second lubricant circuit 52 may include one or more sub-circuits, which sub-circuits of FIG. 1 include a second source circuit 58 and a second return circuit 60. The second source circuit 58 fluidly couples and extends longitudinally between the second lubricant reservoir outlet 54 and one or more second lubricant feeds 62; e.g., outlets, nozzles, jets, etc. These second lubricant feeds 62 are configured to inject, spray and/or otherwise deliver the second lubricant to one or more or all of the second components 42; e.g., into the second volume 44 onto/towards the second components 42. The second source pump 48 is fluidly coupled inline with the second source circuit 58 between the second lubricant reservoir 46 and the second lubricant feeds 62. The second source pump 48 may thereby direct (e.g., pump) the second lubricant through the second source circuit 58 from the second lubricant reservoir 46 to the second lubricant feeds 62 for lubricating, cooling and/or otherwise servicing the second components 42 within and/or otherwise fluidly coupled with the second volume 44.

The second return circuit 60 fluidly couples and extends longitudinally between at least one second lubricant collection device 64 (e.g., a sump, a gutter, a drain, etc.) for the second volume 44 and the second lubricant reservoir inlet 56. The second return pump 50 is fluidly coupled inline with the second return circuit 60 between the second lubricant collection device 64 and the second lubricant reservoir 46. The second return pump 50 may thereby direct (e.g., pump) the second lubricant through the second return circuit 60 from the second lubricant collection device 64 to the second lubricant reservoir 46. Alternatively, the second return pump 50 may be omitted and the second lubricant may be directed through the second return circuit 60 from the second lubricant collection device 64 to the second lubricant reservoir 46 by gravity.

The seal assembly 16 is configured to fluidly separate the first volume 20 from the second volume 44. The seal assembly 16 of FIG. 1, for example, includes a first seal element 66, a second seal element 68 and an inter-seal cavity 70; e.g., an empty cavity. Briefly, the first seal element 66 is disposed between and fluidly separates the first volume 20 from the inter-seal cavity 70. The second seal element 68 is disposed between and fluidly separates the second volume 44 from the inter-seal cavity 70. The inter-seal cavity 70 is disposed between and formed by the first seal element 66 and the second seal element 68. This inter-seal cavity 70 thereby provides a buffer cavity between the first volume 20 and the second volume 44. With this arrangement, first fluid (e.g., air, the first lubricant, or a mixture of air and the first lubricant) leaking across the first seal element 66 from the first volume 20 enters the inter-seal cavity 70, not the second volume 44. Similarly, second fluid (e.g., air, the second lubricant, or a mixture of air and the second lubricant) leaking across the second seal element 68 from the second volume 44 enters the inter-seal cavity 70, not the first volume 20.

A fluid pressure in the inter-seal cavity 70 (the buffer cavity) may be less than a fluid pressure in the first volume 20 and a fluid pressure in the second volume 44. The fluid pressure in the first volume 20 may be different (e.g., greater or less) than or alternatively equal to the fluid pressure in the second volume 44. With the foregoing pressure differentials across the seal elements 66 and 68, any of the first fluid and/or the second fluid which leaks into the inter-seal cavity 70 may drain out of the inter-seal cavity 70 and be directed away from the first volume 20 and the second volume 44 through a drain passage 72. This drain passage 72 may fluidly couple the inter-seal cavity 70 to a container 74. The container 74 may collect the leaked first and/or second fluids for later inspection and/or disposal. Where the leaked fluid is inspected, maintenance personnel may evaluate operation of the seal assembly 16 be comparing how much of the leaked fluid is collected within the container 74 to the amount of time the aircraft operated since its last inspection. Moreover, the maintenance personnel may determine which of the seal elements 66 and 68 may be worn, damaged, etc. based on which one of the lubricants is collected in the container 74. It is contemplated, of course, the container 74 may be omitted and the drain passage 72 may direct the leaked first and/or second fluids to another volume or volumes within and/or outside of the aircraft system 10.

Figure 2:
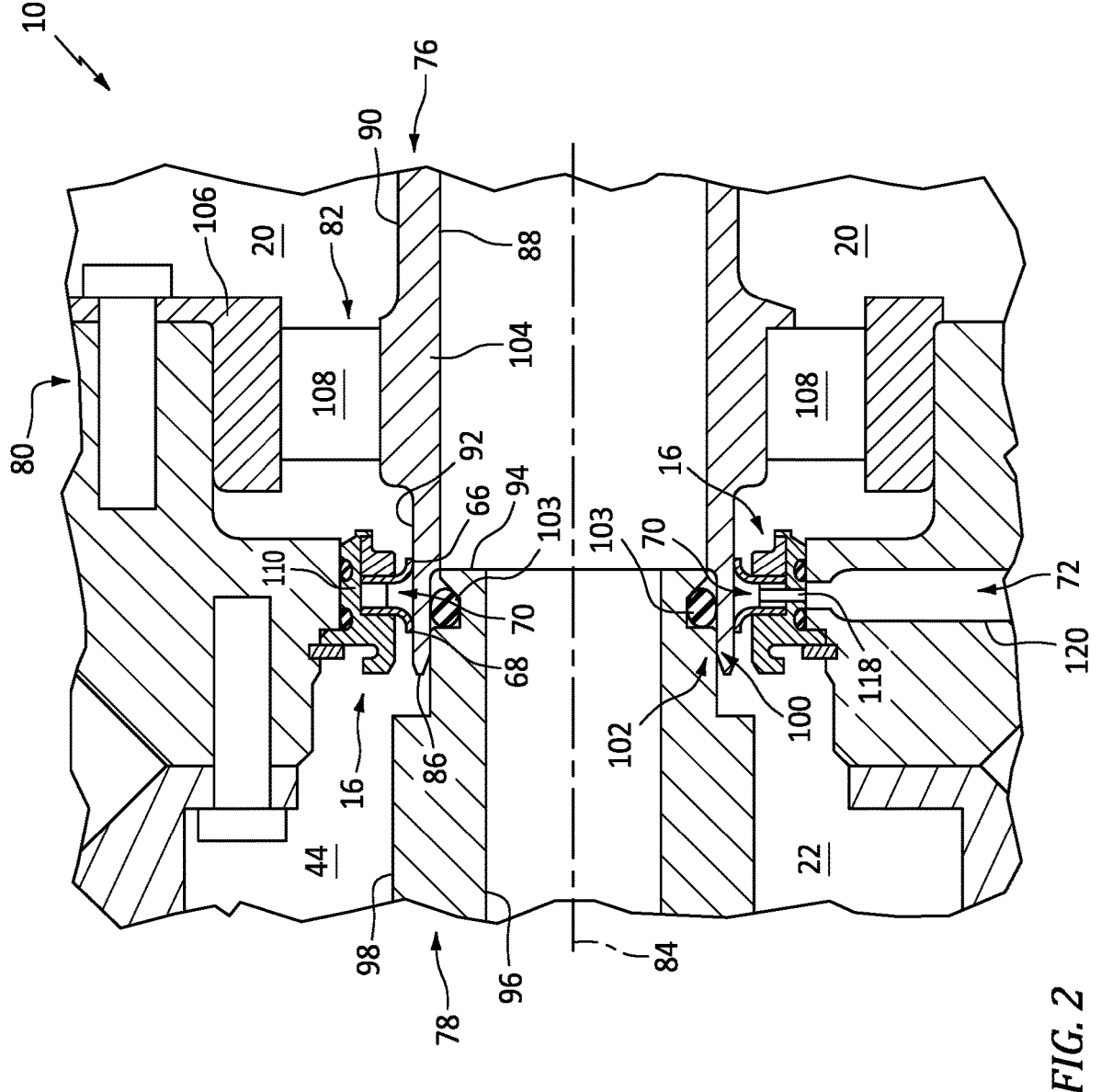
FIG. 2 is a partial sectional illustration of the aircraft system.

FIG. 2 illustrates an exemplary embodiment of the aircraft system 10 and its seal assembly 16. In addition to the seal assembly 16, the aircraft system 10 of FIG. 2 includes a first rotating structure 76, a second rotating structure 78, a stationary structure 80 and a bearing 82; e.g., a rolling element bearing, a journal bearing, etc. Each of the rotating structures 76, 78 is configured to rotate about a rotational axis 84, which axis 84 may also be a centerline axis of the first rotating structure 76, the second rotating structure 78, the stationary structure 80 and/or the seal assembly 16.

The first rotating structure 76 extends axially along the axis 84 in a first axial direction (e.g., right-to-left in FIG. 2) to an axial end 86 of the first rotating structure 76. The first rotating structure 76 extends radially between and to a radial inner side 88 of the first rotating structure 76 and a radial outer side 90 of the first rotating structure 76. The first rotating structure 76 of FIG. 2 includes a (e.g., cylindrical) seal land surface 92 at the first structure outer side 90. The first rotating structure 76 and its seal land surface 92 extend circumferentially about (e.g., completely) around the axis 84, providing the first rotating structure 76 with a full-hoop (e.g., tubular) body. This first rotating structure 76 may be configured as or otherwise include a (e.g., hollow) first rotating structure shaft. Alternatively, the first rotating structure 76 may be configured as or otherwise include a sleeve or other element mounted to (e.g., mounted on) the first rotating structure shaft.

The second rotating structure 78 extends axially along the axis 84 in a second axial direction (e.g., left-to-right in FIG. 2) to an axial end 94 of the second rotating structure 78, which second axial direction is opposite the first axial direction. The second rotating structure 78 extends radially between and to a radial inner side 96 of the second rotating structure 78 and a radial outer side 98 of the second rotating structure 78. The second rotating structure 78 extends circumferentially about (e.g., completely) around the axis 84, providing the second rotating structure 78 with a full-hoop (e.g., tubular) body. This second rotating structure 78 may be configured as or otherwise include a (e.g., hollow) second rotating structure shaft. Alternatively, the second rotating structure 78 may be configured as or otherwise include a sleeve or other element mounted to (e.g., mounted on) the second rotating structure shaft.

The second rotating structure 78 is operatively coupled to the first rotating structure 76. For example, an axial end portion of the second rotating structure 78 of FIG. 2 at its second structure end 94 is mated with an axial end portion of the first rotating structure 76 at its first structure end 86. The axial end portion of the second rotating structure 78 projects axially into an inner bore 100 of the first rotating structure 76 and its axial end portion. The first rotating structure 76 and its axial end portion thereby axially overlap and circumscribe the first rotating structure 76 and its axial end portion. The inner bore 100 of FIG. 2 is formed by the first structure inner side 88, and the inner bore 100 projects axially into (or through) the first rotating structure 76 from the first structure end 86. The axial end portion of the second rotating structure 78 may be secured to the axial end portion of the first rotating structure 76 at an interface 102 (e.g., a coupling, a connection, etc.) between/formed by the first rotating structure 76 and the second rotating structure 78. The second rotating structure 78, for example, may be rotationally fixed to the first rotating structure 76 through a splined connection between the rotating structures 76 and 78. The present disclosure, however, is not limited to such an exemplary coupling technique. In some embodiments, the inter-structure interface 102 may be a sealed interface. The inter-structure interface 102 of FIG. 2, for example, includes a seal element 103 (e.g., an O-ring) between the first rotating structure 76 and the second rotating structure 78.

The seal land surface 92 may be disposed radially outboard of and may be axially aligned with the inter-structure interface 102. The axial end portion of the first rotating structure 76 of FIG. 2, for example, includes or at least partially forms the seal land surface 92. With this arrangement, the seal land surface 92 axially overlaps and circumscribes the inter-structure interface 102 and the axial end portion of the second rotating structure 78.

The stationary structure 80 of FIG. 2 is disposed radially outboard of the first rotating structure 76 and/or the second rotating structure 78. The stationary structure 80 extends axially along the first rotating structure 76 and/or the second rotating structure 78. The stationary structure 80 extends circumferentially about (e.g., completely around) the first rotating structure 76 and/or the second rotating structure 78. The stationary structure 80 may thereby partially or completely house the first rotating structure 76 and/or the second rotating structure 78. With this arrangement, the stationary structure 80 of FIG. 2 is disposed radially outboard of, axially overlaps and circumscribes the inter-structure interface 102.

The bearing 82 of FIG. 2 is disposed within the first volume 20 and may be axially next to (or otherwise proximate) the seal assembly 16. The bearing 82 is configured to rotatably mount the first rotating structure 76 and, thus, the second rotating structure 78 to the stationary structure 80. The bearing 82 of FIG. 2, for example, includes a radial inner race 104, a radial outer race 106 and a plurality of bearing elements 108. The inner race 104 of FIG. 2 is formed integral with (e.g., is a part of) the first rotating structure 76 at the first structure outer side 90. The inner race 104, however, may alternatively be formed discrete from the first rotating structure 76 and subsequently mounted onto the first rotating structure 76. Referring again to FIG. 2, the outer race 106 is mounted to the stationary structure 80. This outer race 106 extends axially along and extends circumferentially about (e.g., completely around) the axis 84. The outer race 106 is disposed radially outboard of the inner race 104 and an array of the bearing elements 108. The outer race 106 thereby axially overlaps and circumscribes the inner race 104 and the bearing element array. The bearing elements 108 are arranged circumferentially about the axis 84 in the bearing element array. This bearing element array and its bearing elements 108 are arranged radially between the inner race 104 and the outer race 106. Each of the bearing elements 108 radially engages a radial outer surface of the inner race 104 and a radial inner surface of the outer race 106.

The seal assembly 16 of FIG. 2 arranged at (e.g., on, adjacent or proximate) the inter-structure interface 102, radially between the first rotating structure 76 and the stationary structure 80. This seal assembly 16 is configured to seal an annular gap between the first rotating structure 76 and the stationary structure 80. The seal assembly 16 may thereby close off an axial passage between the first volume 20 and the second volume 44. Here, the first volume 20 of FIG. 2 is formed by and extends radially between the first rotating structure 76 and the stationary structure 80, to a first (e.g., right) side of the seal assembly 16. The second volume 44 of FIG. 2 is formed by and extends radially between the second rotating structure 78 and the stationary structure 80, to a second (e.g., left) side of the seal assembly 16. The seal assembly 16 of FIG. 2 includes a seal carrier 110, the first seal element 66 and the second seal element 68.

Figure 3:
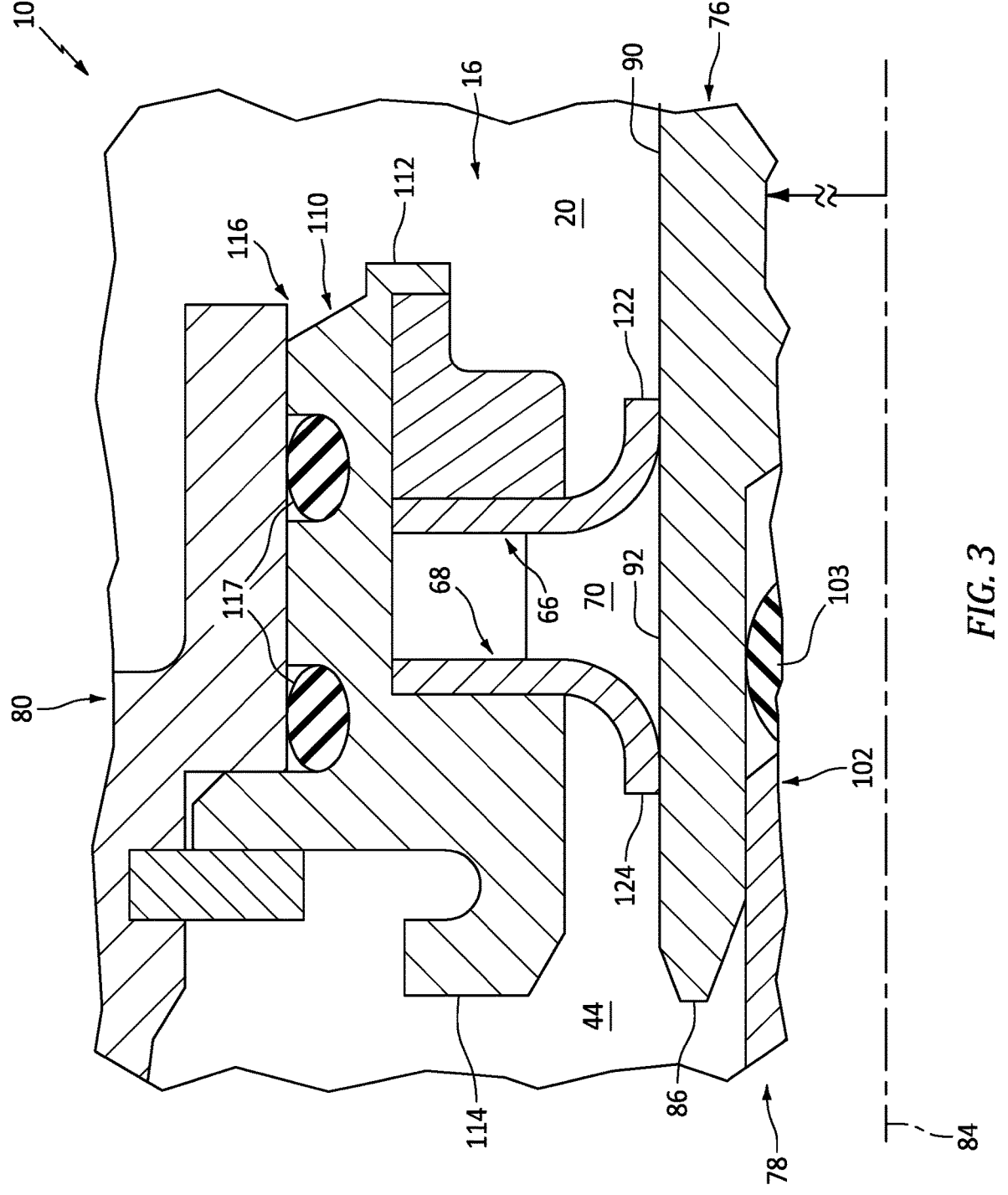
FIG. 3 is a partial sectional illustration of the aircraft system along a (e.g., top) side of a seal assembly of FIG. 2.
Figure 4:
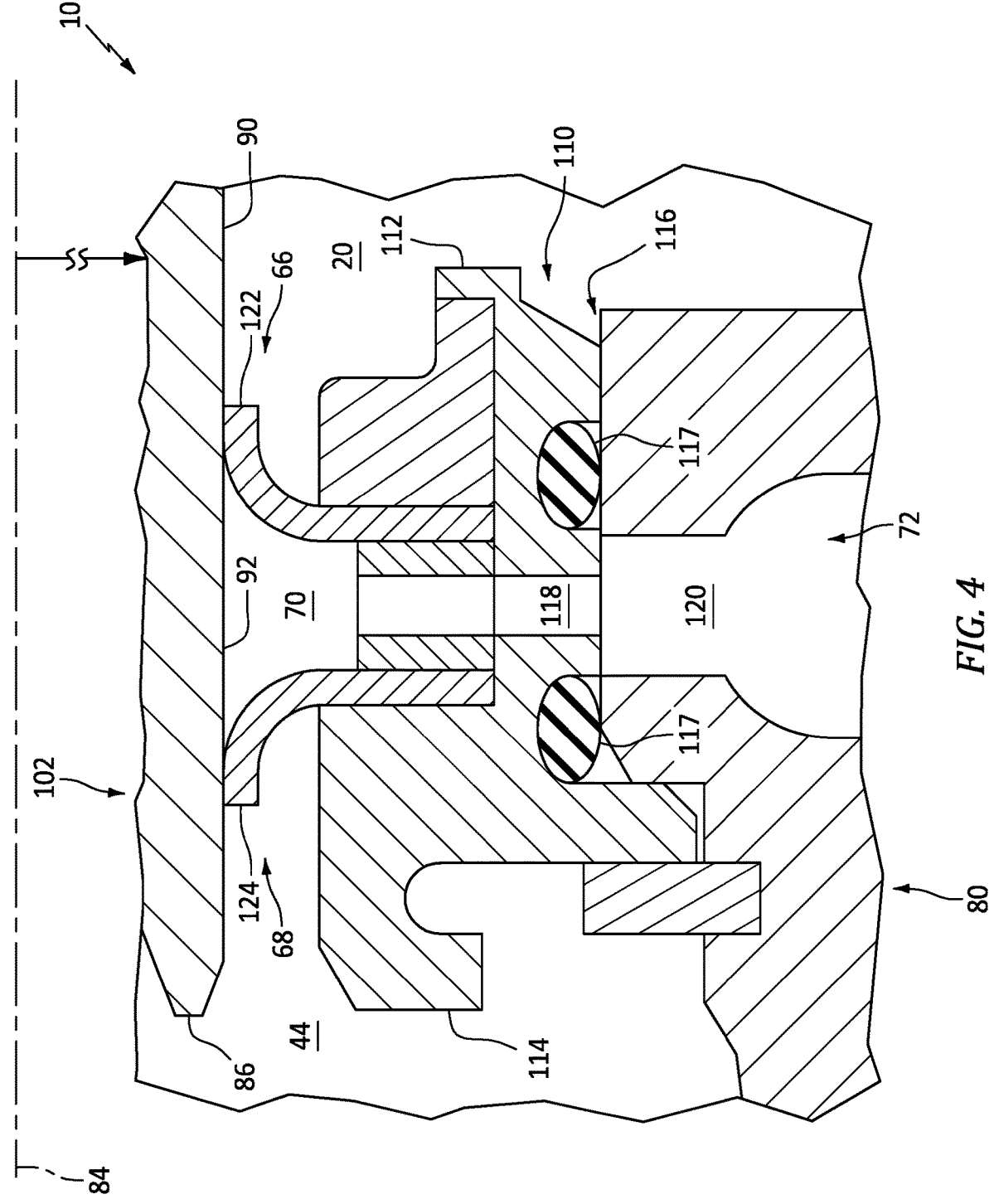
FIG. 4 is a partial sectional illustration of the aircraft system along a (e.g., bottom) side of the seal assembly of FIG. 2.

Referring to FIGS. 3 and 4, the seal carrier 110 extends axially along the axis 84 between and to an axial first end 112 of the seal carrier 110 and an axial second end 114 of the seal carrier 110. The seal carrier 110 extends circumferentially about (e.g., completely around) the axis 84, providing the seal carrier 110 with a full-hoop (e.g., annular) body. The seal carrier 110 is disposed in an inner bore 116 of the stationary structure 80 and fixedly mounted to the stationary structure 80. One or more seal elements 117 (e.g., O-rings) may be arranged between the seal carrier 110 and the stationary structure 80 to provide a sealed interface between the seal carrier 110 and the stationary structure 80. Here, the seal carrier 110 is spaced radially outboard from and axially aligned with the inter-structure interface 102 and/or the seal land surface 92. More particularly, the seal carrier 110 of FIG. 2 axially overlaps and circumscribes the inter-structure interface 102 and/or the seal land surface 92. It is contemplated, however, the seal carrier 110 is axially offset from the inter-structure interface 102 in other embodiments. Referring to FIG. 4, the seal carrier 110 may include a drain aperture 118 (e.g., axially and circumferentially) aligned with and fluidly coupled to a drain aperture 120 in the stationary structure 80. At least (or only) these drain apertures 118 and 120 may collectively form the drain passage 72, where the drain passage 72 fluidly couples the inter-seal cavity 70 to the container 74 (and/or other volume(s)); see FIG. 1.

Each of the seal elements 66, 68 of FIGS. 3 and 4 is fixedly mounted to the seal carrier 110. The seal carrier 110 thereby fixedly mounts the seal elements 66 and 68 to the stationary structure 80. The first seal element 66 is axially spaced along the axis 84 from the second seal element 68. Each of the seal elements 66, 68 of FIGS. 3 and 4 projects radially inward (in a direction towards the axis 84) from the seal carrier 110 to a distal radial inner end 122, 124 of that respective seal element 66, 68. Each of the seal elements 66, 68 may sealingly engage (e.g., radially contact) the seal land surface 92 at or about its respective seal element inner end 122, 124. For example, as the rotating structures 76 and 78 rotate about the axis 84 within the stationary structure 80 and the seal assembly 16, the seal elements 66 and 68 of FIGS. 3 and 4 press radially against the first rotating structure 76 and its seal land surface 92 such that the first rotating structure 76 and its seal land surface 92 may circumferentially slide along and stay in radial contact with the seal elements 66 and 68. With this arrangement, the inter-seal cavity 70 is formed axially along the axis 84 between and by the first seal element 66 and the second seal element 68. This inter-seal cavity 70 is further formed radially between and by the first rotating structure 76 and its seal land surface 92 and the seal carrier 110. The first seal element 66 is disposed axially between and substantially fluidly separates the first volume 20 and the inter-seal cavity 70. The second seal element 68 is disposed axially between and substantially fluidly separates the second volume 44 and the inter-seal cavity 70.

Under certain conditions, a relatively small quantity of the first fluid may leak across the first seal element 66 from the first volume 20 into the inter-seal cavity 70. The first fluid, for example, may leak between the seal land surface 92 and the first seal element 66 at its first seal element inner end 122. A relatively small quantity of the second fluid may also or alternatively leak across the second seal element 68 from the second volume 44 into the inter-seal cavity 70. The second fluid, for example, may leak between the seal land surface 92 and the second seal element 68 at its second seal element inner end 124. Since the fluid pressure within the inter-seal cavity 70 may be less than the fluid pressure within the first volume 20 and the fluid pressure within the second volume 44, the leaked first and/or second fluid may flow out of the inter-seal cavity 70 into the drain passage 72, rather than across the other seal element and into the other volume. The seal assembly 16 of FIGS. 3 and 4 may thereby reduce or prevent cross-contamination of the first and the second fluids. The seal assembly 16, for example, may reduce or prevent the first fluid from leaking into the second volume 44, and the seal assembly 16 may reduce or prevent the second fluid from leaking into the first volume 20. Moreover, the leaked first and/or second fluid may be collected within the container 74 (see FIG. 1) for subsequent inspection. Of course, in other embodiments, it is contemplated the drain passage 72 and/or the container 74 may be configured with a sensor or sensors for monitoring the leaked fluid during aircraft flight.

In some embodiments, referring to FIGS. 2-4, one or more of the seal elements 66 and/or 68 may each be configured as a lip seal. Each seal element 66, 68 (e.g., lip seal) may be constructed from a polymeric material (e.g., an elastomeric material) such as, but not limited to, polytetrafluoroethylene (e.g., Teflon®) rubber. The present disclosure, however, is not limited to such an exemplary seal element configuration or material composition. For example, in other embodiments, one or more of the seal elements 66 and/or 68 (generally shown in FIG. 1) may each be configured as a carbon face seal, a carbon magnetic seal, an energized polytetrafluoroethylene (PTFE) (e.g., Teflon®) lip seal, an energized elastomer seal, etc. Here, a carbon seal element may radially or axially engage a seal land element mounted to or formed integral with the first rotating structure 76. Moreover, while the seal elements 66 and 68 are generally described above with common (e.g., the same or similar) configurations and/or constructions, the present disclosure is not limited to such an arrangement. For example, in other embodiments, the first seal element 66 may have a different configuration, spatial placement and/or material construction than the second seal element 68.

Figure 5:
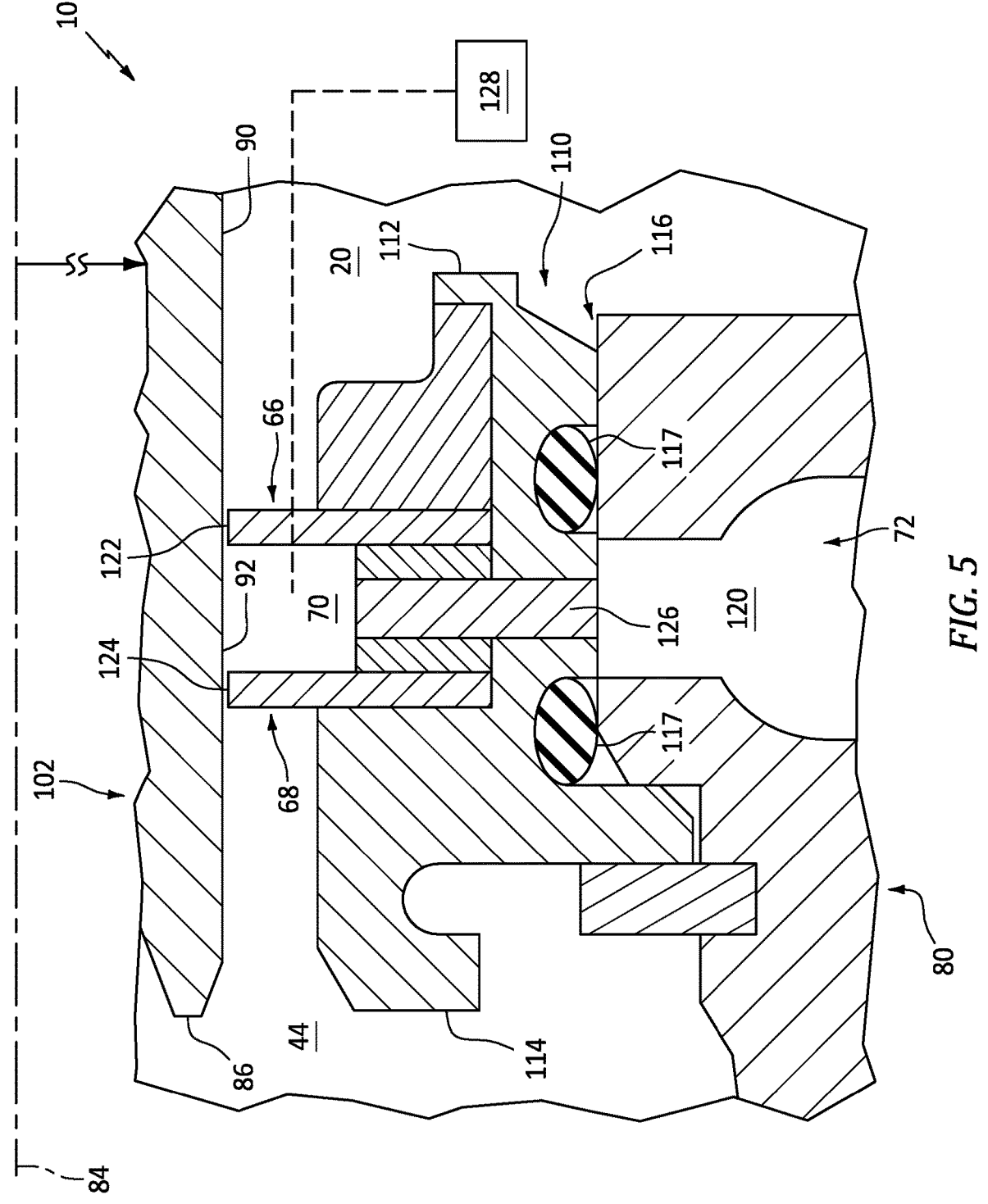
FIG. 5 is a partial sectional illustration of the aircraft system along the (e.g., bottom) side of the seal assembly with its drain passage plugged.

In some embodiments, the fluid pressure within the inter-seal cavity 70 may be less than the fluid pressure within the first volume 20 and the fluid pressure within the second volume 44. In other embodiments, referring to FIG. 5, the fluid pressure within the inter-seal cavity 70 may be greater than the fluid pressure within the first volume 20 and/or the fluid pressure within the second volume 44. The drain passage 72, for example, may be plugged by a plug 126, and a fluid source 128 may direct pressurized gas (e.g., compressed air) into the inter-seal cavity 70. With this positive pressure inter-seal cavity arrangement, when and if leakage occurs across the first seal element 66 and/or the second seal element 68, the pressurized gas may flow into the first volume 20 and/or the second volume 44. Here, a control gap may be provided between each seal element 66, 68 and the seal land surface 92; however, in other embodiments, one or both seal elements 66, 68 may contact the seal land surface 92. Note, the fluid source 128 is fluidly coupled to the inter-seal cavity 70 by a passage schematically shown via the dashed line. This passage may be formed in the stationary structure 80 and/or one or more other structures of the aircraft system 10.

Figure 6:
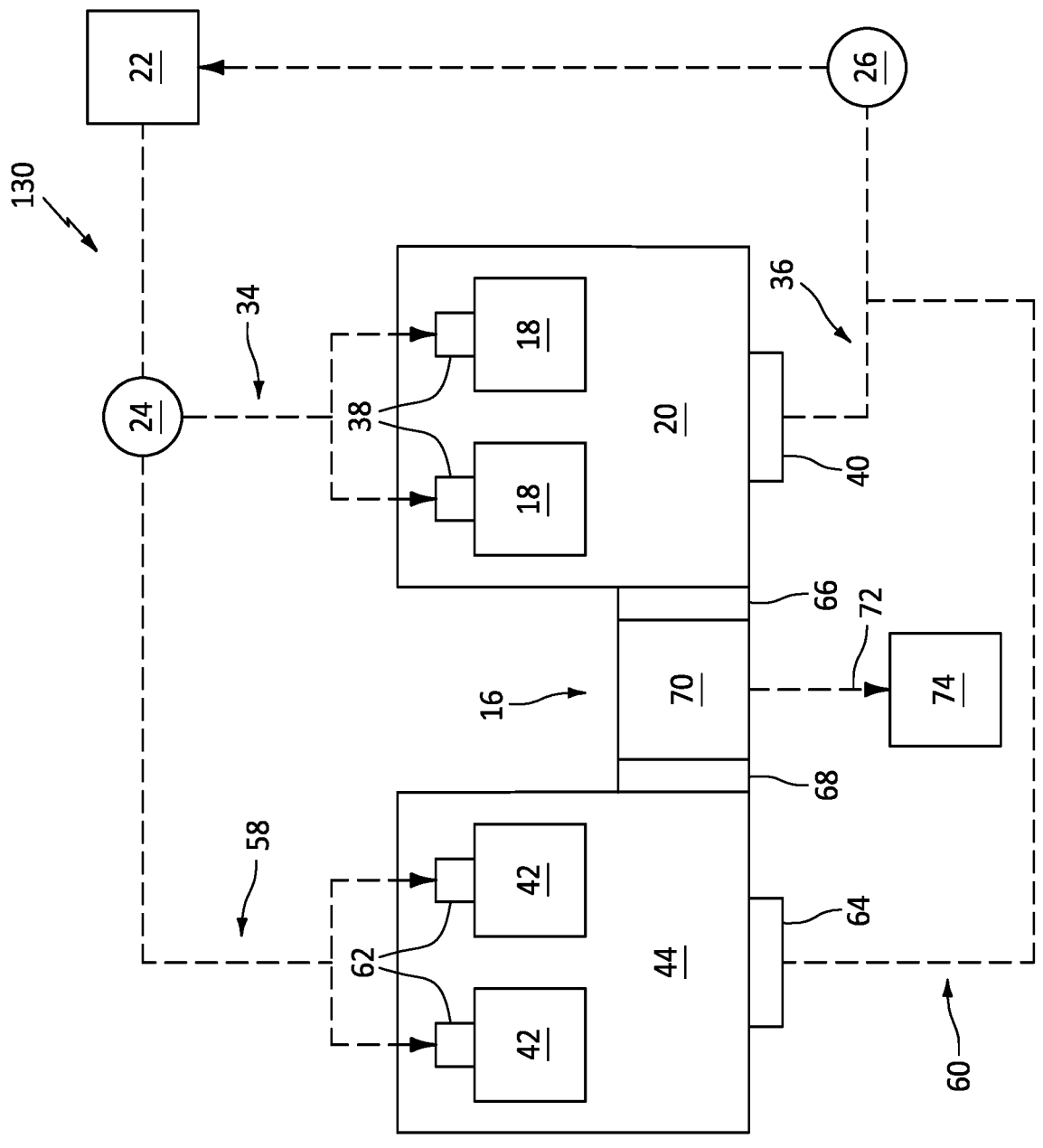
FIG. 6 is a schematic illustration of the aircraft system with an alternative lubrication system arrangement.

In some embodiments, referring to FIG. 1, the first volume 20 and the second volume 44 may be respectively associated with the discrete lubrication systems 12 and 14. In other embodiments, referring to FIG. 6, a common lubrication system 130 may alternatively service both the first components 18 and the second components 42.

Figure 7:
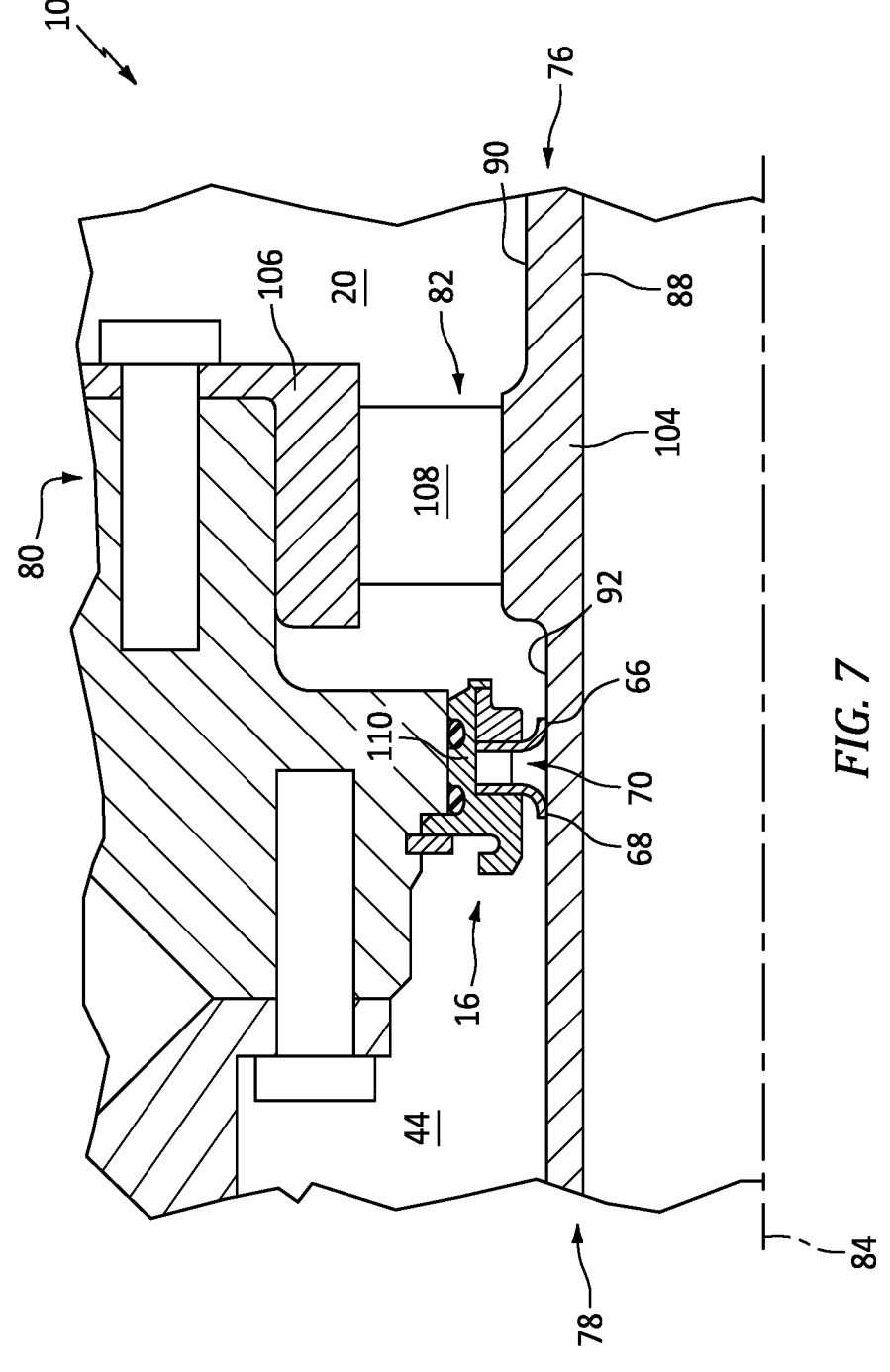
FIG. 7 is a partial sectional illustration of the aircraft system with a single rotating structure at the seal assembly.

In some embodiments, referring to FIG. 2, the first rotating structure 76 may be configured as a discrete body from the second rotating structure 78. In other embodiments, referring to FIG. 7, the first and the second rotating structures 76 and 78 may be formed integrally with one another as a single rotating body.

Figure 8:
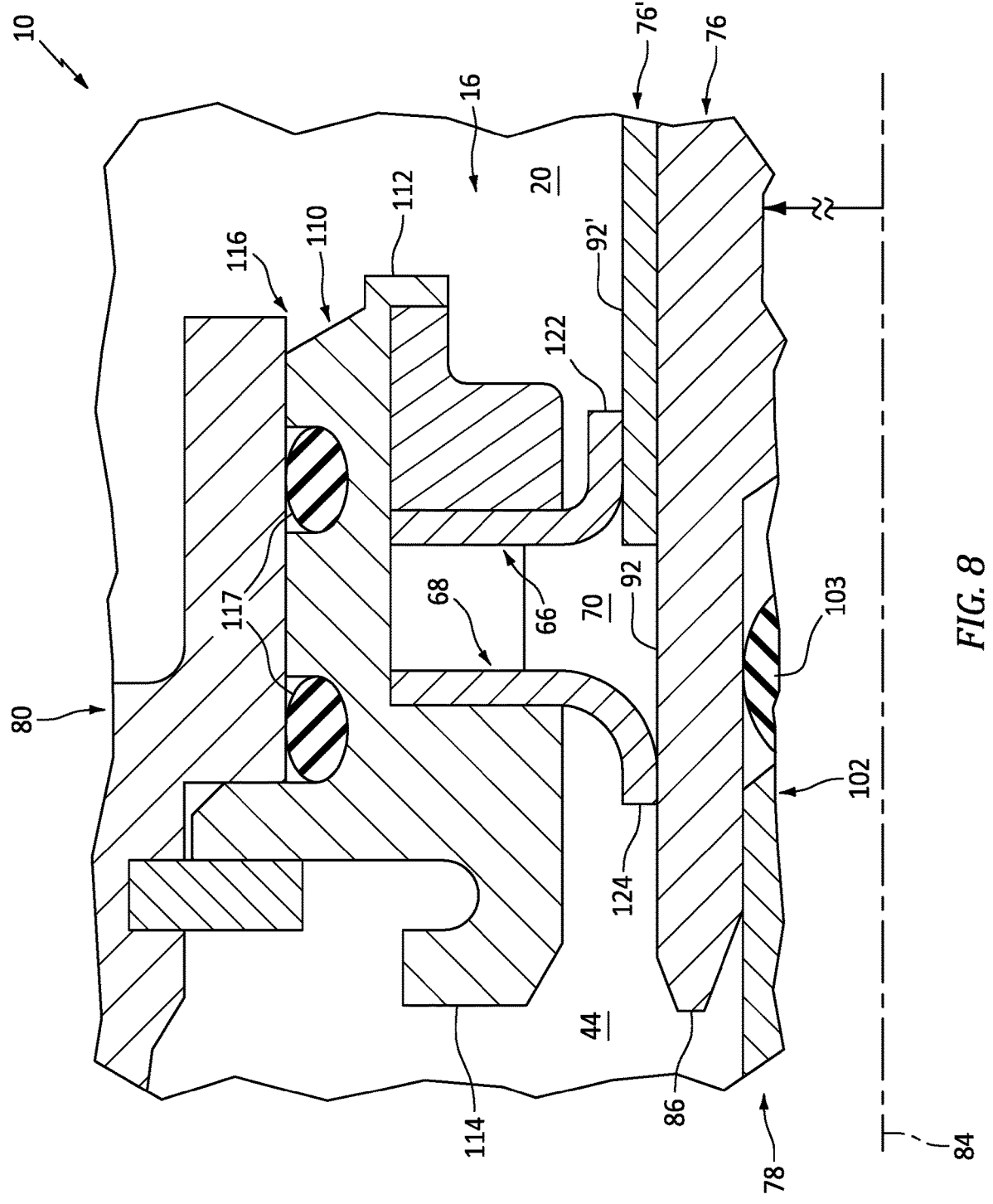
FIG. 8 is a partial sectional illustration of the aircraft system with multiple seal lands.

In some embodiments, referring to FIG. 3, each of the seal elements 66 and 68 may sealingly engage a common seal land surface 92. In other embodiments, referring to FIG. 8, the seal elements 66 and 68 may respective sealing engage discrete seal land surfaces 92' and 92. A sleeve 76', for example, may be mounted onto (e.g., circumscribe and attached to) the first rotating structure 76. This first seal element 66 of FIG. 8 is disposed radially outboard of and sealingly engages (e.g., contacts) the sleeve 76' and its seal land surface 92'. In the specific embodiment of FIG. 8, a radius of the seal land surface 92' is larger than a radius of the seal land surface 92. However, in other embodiments, the radius of the seal land surface 92' may be less than, or even equal to (e.g., when the surfaces 92 and 92' are axially spaced and/or otherwise physically distinct), the radius of the seal land surface 92. Moreover, it is contemplated the sleeve 76' may alternatively be configured as an integral step in the first rotating structure 76. The first rotating structure 76 and the sleeve 76', for example, may be formed as a single, unitary body where the surfaces 92 and 92' are stepped surfaces.

Figure 9:
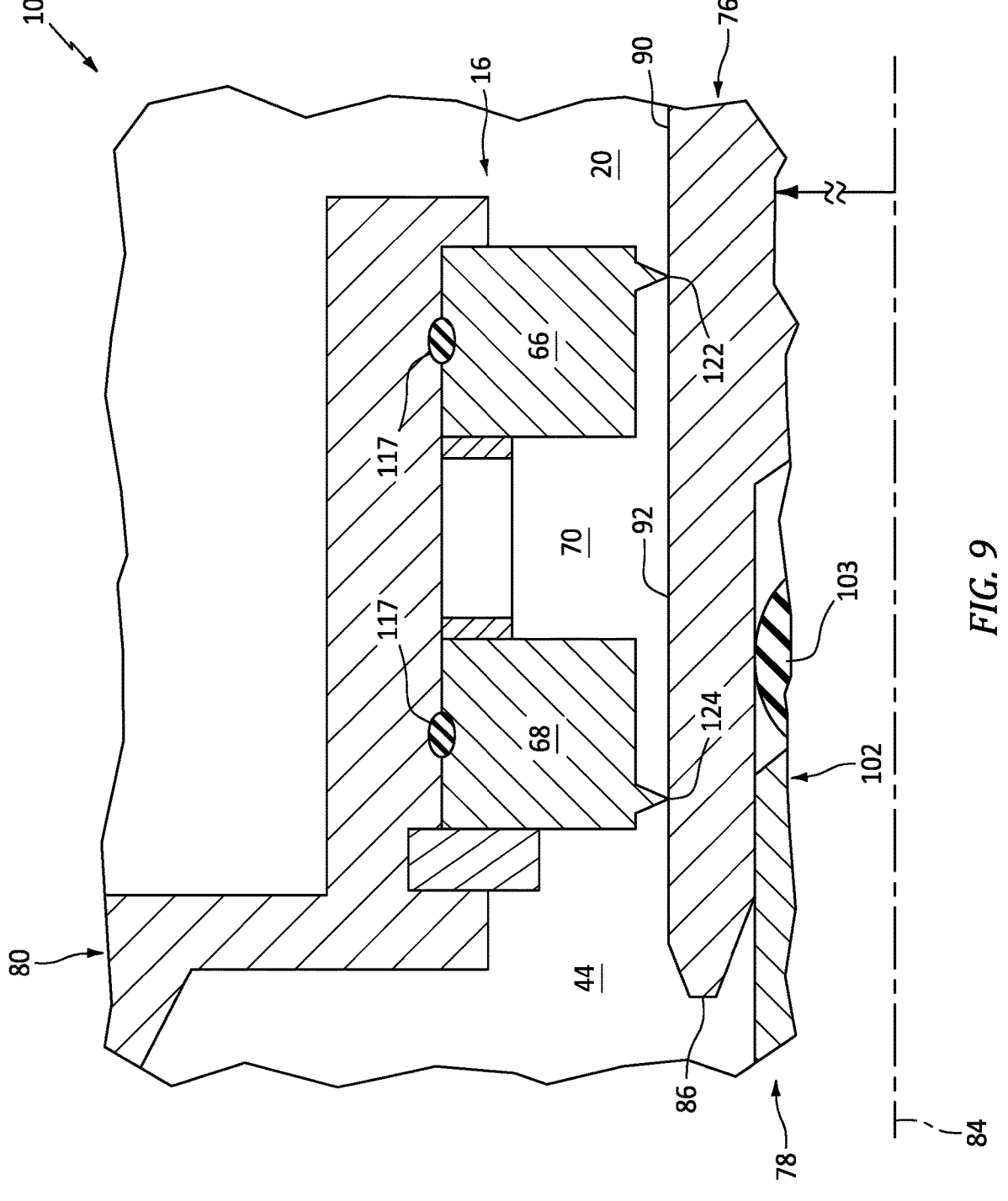
FIG. 9 is a partial sectional illustration of the aircraft system with multiple seal elements mounted to a stationary structure without a seal carrier.

In some embodiments, referring to FIG. 3, one or more of the seal elements 66 and/or 68 may be mounted to a common seal carrier 110. In other embodiments, referring to FIG. 9, one or more of the seal elements 66 and/or 68 may be mounted (e.g., directly) to the stationary structure 80 without a seal carrier. In the specific embodiment of FIG. 9, each of the seal elements 66 and 68 is configured as a lip seal element; however, this arrangement is not limited to such exemplary seal elements.

Figure 10:
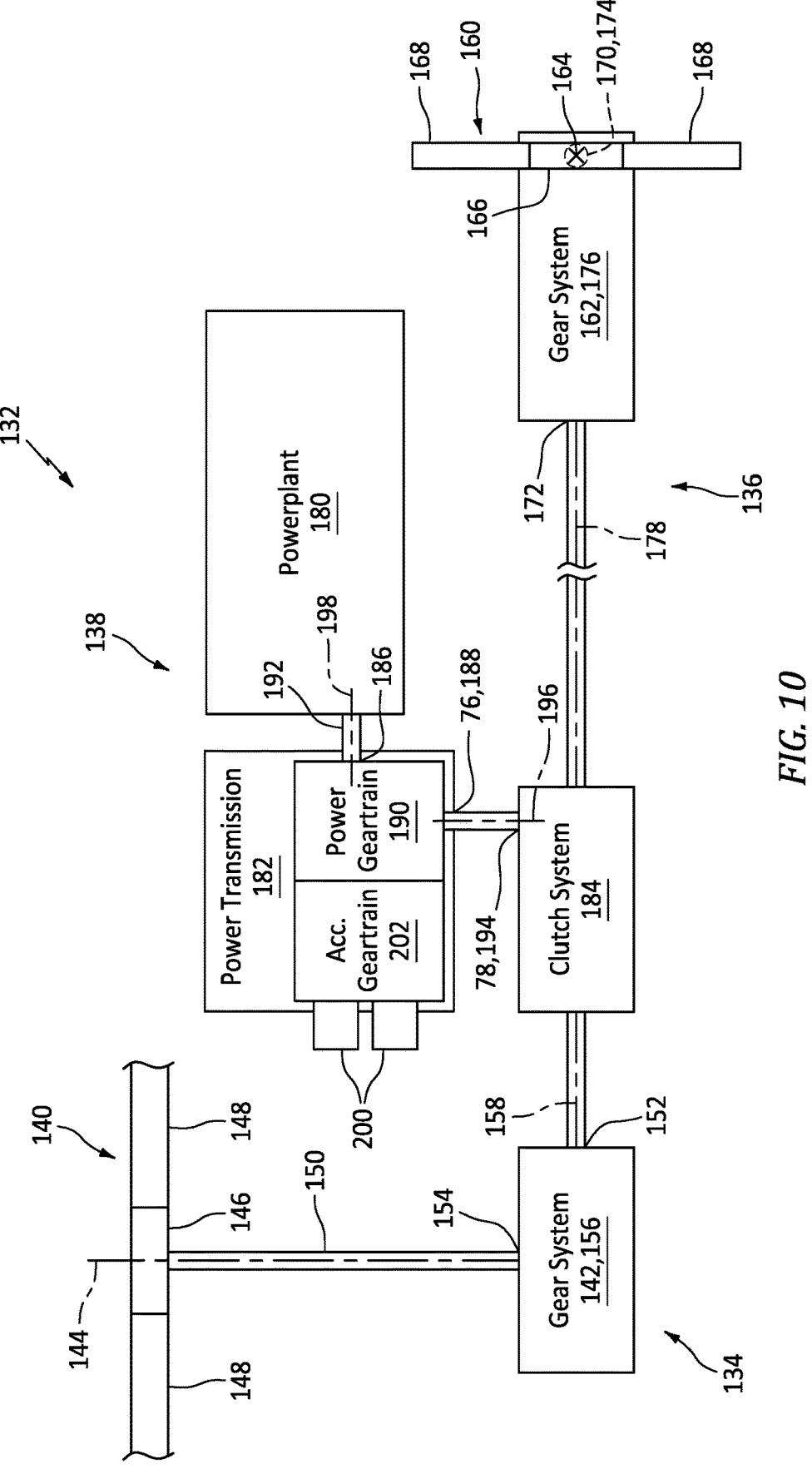
FIG. 10 is a partial schematic illustration of an aircraft powertrain.

FIG. 10 illustrates an exemplary embodiment of the aircraft system 10 configured as a powertrain 132 for the aircraft. This aircraft powertrain 132 includes one or more rotor systems 134 and 136 and a power system 138 for mechanically driving operation of the rotor systems 134 and 136.

The first rotor system 134 of FIG. 10 includes a first bladed rotor 140 (e.g., an air mover) and a first gear system 142. The first bladed rotor 140 may be configured as a main rotor for the aircraft (e.g., a rotorcraft main rotor), and the first gear system 142 may be configured as a main rotor gearbox of the aircraft powertrain 132.

The first bladed rotor 140 of FIG. 10 is configured to rotate about a first rotor axis 144 (e.g., a vertical axis) to generate aircraft lift and/or aircraft thrust. The first bladed rotor 140 includes a first rotor base 146 (e.g., a hub) and a plurality of first rotor blades 148 arranged circumferentially around, projecting radially out from and connected to the first rotor base 146.

The first gear system 142 is operatively coupled to the first bladed rotor 140 and its first rotor base 146 through at least one transmission device such as a first rotor shaft 150; e.g., a main rotor mast. The first gear system 142 of FIG. 10 includes an input 152, an output 154 and a geartrain 156; e.g., internal gearing. The first gear system input 152 is coupled to the power system 138. The first gear system output 154 is coupled to the first bladed rotor 140 through the first rotor shaft 150. The first gear system geartrain 156 couples the first gear system input 152 to the first gear system output 154. The first gear system geartrain 156 may be configured such that the first gear system input 152 is operable to rotate at a different (e.g., faster or slower) rotational speed than the first gear system output 154. The first gear system 142 may thereby be configured as a speed change device between the power system 138 and the first bladed rotor 140. The first gear system geartrain 156 may also (or alternatively) be configured to change a direction of power transmission through the first gear system 142. For example, the first gear system output 154 may rotate with the first bladed rotor 140 about the first rotor axis 144, and the first gear system input 152 may rotate about another axis 158 which is angularly offset from (e.g., perpendicular to) the first rotor axis 144. The present disclosure, however, is not limited to such an exemplary first gear system arrangement. The first gear system 142 and its first gear system geartrain 156, for example, may alternatively be configured such that the first gear system input 152 and the first gear system output 154 rotate at a common (the same) rotational speed.

The second rotor system 136 of FIG. 10 includes a second bladed rotor 160 (e.g., an air mover) and a second gear system 162. The second bladed rotor 160 may be configured as a tail rotor for the aircraft (e.g., a rotorcraft tail rotor), and the second gear system 162 may be configured as a tail rotor gearbox of the aircraft powertrain 132.

The second bladed rotor 160 of FIG. 10 is configured to rotate about a second rotor axis 164 (e.g., a horizontal axis) to generate lateral thrust to counteract a torque effect associated with rotation of the first bladed rotor 140. The second bladed rotor 160 includes a second rotor base 166 (e.g., a hub) and a plurality of second rotor blades 168 arranged circumferentially around, projecting radially out from and connected to the second rotor base 166.

The second gear system 162 is operatively coupled to the second bladed rotor 160 and its second rotor base 166 through at least one transmission device such as a second rotor shaft 170; e.g., a tail rotor shaft. The second gear system 162 of FIG. 10 includes an input 172, an output 174 and a geartrain 176; e.g., internal gearing. The second gear system input 172 is coupled to the power system 138. The second gear system output 174 is coupled to the second bladed rotor 160 through the second rotor shaft 170. The second gear system geartrain 176 couples the second gear system input 172 to the second gear system output 174. The second gear system geartrain 176 may be configured such that the second gear system input 172 is operable to rotate at a different (e.g., faster or slower) rotational speed than the second gear system output 174. The second gear system 162 may thereby be configured as a speed change device between the power system 138 and the second bladed rotor 160. The second gear system geartrain 176 may also (or alternatively) be configured to change a direction of power transmission through the second gear system 162. For example, the second gear system output 174 may rotate with the second bladed rotor 160 about the second rotor axis 164, and the second gear system input 172 may rotate about another axis 178 which is angularly offset from (e.g., perpendicular to) the second rotor axis 164. The present disclosure, however, is not limited to such an exemplary second gear system arrangement. The second gear system 162 and its second gear system geartrain 176, for example, may alternatively be configured such that the second gear system input 172 and the second gear system output 174 rotate at a common (the same) rotational speed. Moreover, in other embodiments, the second rotor shaft 170 may be omitted and the second bladed rotor 160 may be connected (e.g., directly) to the second gear system output 174.

The power system 138 of FIG. 10 includes an aircraft powerplant 180, a power transmission 182 and a clutch system 184. The aircraft powerplant 180 may be configured as or otherwise include a gas turbine engine (e.g., a turboshaft engine), a rotary engine (e.g., a Wenkel engine) or any other type of internal combustion engine capable of generating mechanical power for driving rotation of the bladed propulsor rotors 140 and 160.

The power transmission 182 is configured to operatively couple the aircraft powerplant 180 to the clutch system 184. The power transmission 182 of FIG. 8, for example, includes an input 186, an output 188 (e.g., the first rotating structure 76) and a power geartrain 190; e.g., internal gearing such as an epicyclic gear system, etc. The power transmission input 186 is coupled to an output 192 (e.g., an output shaft) from the aircraft powerplant 180. The power transmission output 188 is coupled to an input 194 into the clutch system 184 (e.g., the second rotating structure 78). The power geartrain 190 couples the power transmission input 186 to the power transmission output 188. The power geartrain 190 may be configured such that the power transmission input 186 is operable to rotate at a different (e.g., faster or slower) rotational speed than the power transmission output 188. This power transmission 182 and its power geartrain 190 may thereby be configured as a speed change device between the aircraft powerplant 180 and the clutch system 184. The power geartrain 190 may also (or alternatively) be configured to change a direction of power transmission 182 through the power transmission 182. For example, the power transmission output 188 may rotate about an output axis 196, and the power transmission input 186 may rotate about an input axis 198 which is angularly offset from (e.g., perpendicular to) the output axis 196. The present disclosure, however, is not limited to such an exemplary power transmission arrangement. The power transmission 182 and its power geartrain 190, for example, may alternatively be configured such that the power transmission input 186 and the power transmission output 188 rotate about a common (the same) axis or parallel axes.

The power transmission 182 may also be configured to operatively couple the aircraft powerplant 180 to one or more external devices 200; e.g., power system accessories, etc. The power transmission 182 of FIG. 8, for example, also includes an accessory geartrain 202; e.g., an accessory gearbox, etc. This accessory geartrain 202 may be driven by the aircraft powerplant 180, for example through a power takeoff from the power geartrain 190. Alternatively, the accessory geartrain 202 may be integrated with or included as a part of the power geartrain 190. A gear of the accessory geartrain 202, for example, may be meshed with a gear of the power geartrain 190. The accessory geartrain 202 is thereby configured to distribute mechanical accessory/supplemental power generated by the aircraft powerplant 180 to the one or more external devices 200. Examples of other external devices 200 include a generator, a starter motor, a lubricant pump, a motor-generator, a fuel pump, a hydraulic pump, and the like.

The clutch system 184 is configured to selectively operatively couple the power transmission 182 and its power geartrain 190 to the first rotor system 134 and/or the second rotor system 136. The clutch system 184 of FIG. 8, for example, is configured to operatively couple the power transmission output 188 to the first gear system input 152 and/or the second gear system input 172 when a clutch or clutches within the clutch system 184 are engaged. The clutch system 184 of FIG. 10 is configured to decouple the power transmission output 188 from the first gear system input 152 and/or the second gear system input 172 when the clutch or the clutches within the clutch system 184 are disengaged. With this arrangement, the aircraft powerplant 180 may be powered up without driving rotation of the first bladed rotor 140 and/or the second bladed rotor 160 when the clutch system 184 is disengaged and/or the first bladed rotor 140 and/or the second bladed rotor 160 may rotate independent of the aircraft powerplant 180 when the clutch system 184 is disengaged.

While the aircraft powertrain 132 is described above with a single first rotor system 134 and a single second rotor system 136, the present disclosure is not limited to such an exemplary arrangement. The aircraft powertrain 132, for example, may alternatively include multiple of the first rotor systems 134. With such an arrangement, the second rotor system 136 may be omitted as torque from the one of the first rotor systems 134 may counteract torque from another one of the first rotor systems 134. Moreover, while the aircraft is generally described above as a rotorcraft, it is contemplated the aircraft system 10 and its seal assembly 16 may also be utilized for other types of aircraft.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a first rotating structure rotatable about an axis;
a second rotating structure rotatable about the axis, the second rotating structure secured to the first rotating structure;
a stationary structure axially overlapping the first rotating structure and the second rotating structure;
a first seal element fixed to the stationary structure and sealingly engaging the first rotating structure; and
a second seal element fixed to the stationary structure and sealingly engaging the first rotating structure, the second seal element axially next to the first seal element;
wherein a cavity is formed by and extends axially between the first seal element and the second seal element, the cavity is formed by and radially adjacent the first rotating structure, and the stationary structure comprises a drain passage fluidly coupled to the cavity,
wherein the second rotating structure is secured to the first rotating structure at an interface between the first rotating structure and the second rotating structure, and
wherein the first seal element or the second seal element is axially aligned with the interface between the first rotating structure and the second rotating structure.

2. The system of claim 1, wherein
the second rotating structure projects into a bore of the first rotating structure; and
the stationary structure axially overlaps the interface between the first rotating structure and the second rotating structure.

3. The system of claim 2, wherein
the stationary structure circumscribes the interface between the first rotating structure and the second rotating structure; and the first seal element and the second seal element each circumscribe the first rotating structure.

4. The system of claim 1, wherein the first seal element is axially between and fluidly separates the cavity and a first volume; and the second seal element is axially between and fluidly separates the cavity and a second volume, and the second volume is fluidly discrete from the first volume.

5. The system of claim 4, further comprising:

a first lubrication system servicing one or more components within the first volume; and a second lubrication system servicing one or more components within the second volume.

6. The system of claim 1, wherein at least one of the first seal element radially engages the first rotating structure; or the second seal element radially engages the first rotating structure.

7. The system of claim 1, wherein the first rotating structure comprises a seal land surface; and the first seal element and the second seal element each contact the seal land surface.

8. The system of claim 1, wherein the first rotating structure comprises a first seal land surface and a second seal land surface;

the first seal element sealingly engages the first seal land surface; and the second seal element sealingly engages the second seal land surface.

9. The system of claim 1, wherein at least one of the first seal element comprises a first lip seal; and the second seal element comprises a second lip seal.

10. The system of claim 1, wherein at least one of the first seal element comprises a first polymeric material; and the second seal element comprises a second polymeric material.

11. The system of claim 1, wherein at least one of the first seal element comprises a first carbon face seal; and the second seal element comprises a second carbon face seal.

12. The system of claim 1, further comprising:

a seal carrier removably mounted to the stationary structure;

the first seal element and the second seal element each attached to the seal carrier.

13. The system of claim 1, wherein the first seal element and the second seal element are each attached directly to the stationary structure.

14. The system of claim 1, further comprising a bearing rotatably mounting the first rotating structure to the stationary structure, the bearing axially next to the second seal element.

15. The system of claim 1, further comprising:

an aircraft powertrain including a powerplant, a power transmission, a clutch system and a bladed rotor, the power transmission operatively coupling the powerplant to the clutch system, the clutch system operatively coupling the power transmission to the bladed rotor, and the powerplant configured to drive rotation of the bladed rotor through the power transmission and the clutch system when the clutch system is engaged;

the power transmission comprising the first rotating structure; and the clutch system comprising the second rotating structure.

16. The system of claim 1, further comprising:

a container configured to collect fluid drained from the cavity through the drain passage.

17. A system for an aircraft, comprising:

a power transmission comprising a first rotating structure that is rotatable about an axis;

a clutch system comprising a second rotating structure that is rotatable about the axis, the second rotating structure coupled to and rotatable with the first rotating structure;

a stationary structure circumscribing the first rotating structure;

a first seal element fixed to the stationary structure and sealingly engaging the first rotating structure; and a second seal element fixed to the stationary structure and sealingly engaging the first rotating structure, the second seal element axially adjacent the first seal element, wherein the second rotating structure is coupled to the first rotating structure at an interface between the first rotating structure and the second rotating structure, and wherein the first seal element or the second seal element is axially aligned with the interface between the first rotating structure and the second rotating structure.

* * * * *